Oct. 18, 1966  W. W. ROBERTSON  3,279,644
PRESSURE VESSEL CLOSURE
Filed Feb. 25, 1964

INVENTOR.
Walter W Robertson
BY Ralph Hammar
Attorney

3,279,644
PRESSURE VESSEL CLOSURE

Walter W. Robertson, Fairview, Pa., assignor to Autoclave Engineers, Inc., Erie, Pa., a corporation of Pennsylvania
Filed Feb. 25, 1964, Ser. No. 347,245
3 Claims. (Cl. 220—46)

This invention is a threaded closure for pressure vessels which increases the load carrying ability by reducing the difference in stress on the individual threads. This is accomplished by breaking the closure into two or more sections, each carrying the load of a fraction of the cross sectional area of the pressure vessel.

Figure 1:
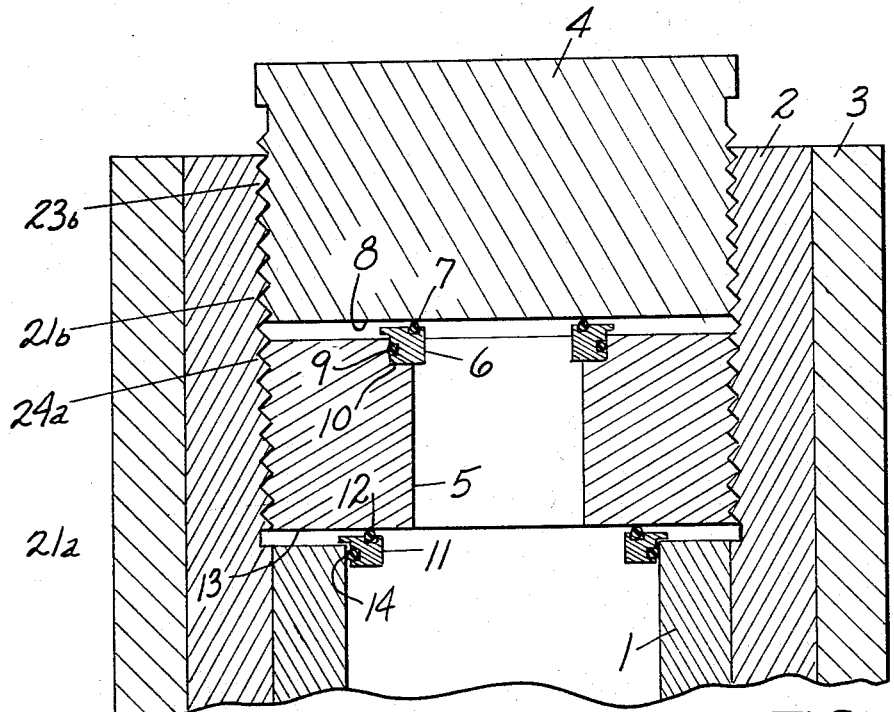
Figure 2:
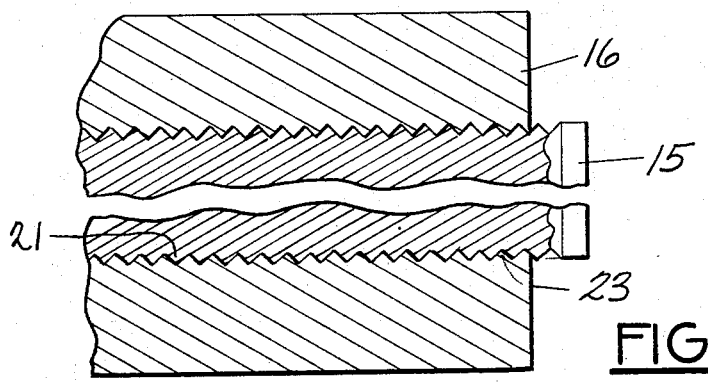
Figure 3:
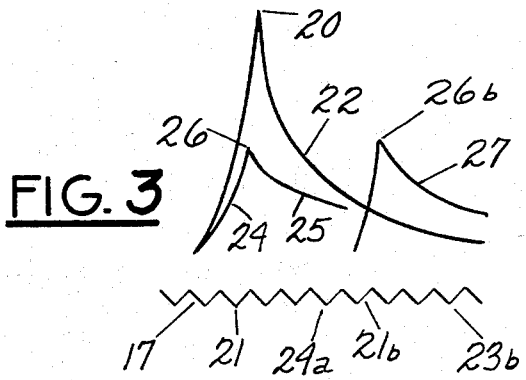

In the drawing, FIG. 1 is a fragmentary longitudinal section through a pressure vessel equipped with a stress reducing closure, FIG. 2 is a longitudinal section through a pressure vessel equipped with a one piece threaded closure, and FIG. 3 is a stress diagram showing the distribution of stress along the threads of the FIGS. 1 and 2 closures.

In the pressure vessel of FIG. 1, the body of the vessel comprises concentric sections 1, 2 and 3. This is a body design used for extremely high pressures. The sections 1, 2 and 3 supplement each other in withstanding the bursting stresses.

The closure comprises a plurality of sections 4 and 5 screwed into the body section 2. The outer closure section 4 is cylindrical and occupies the full diameter of the body section 2. The inner closure section 5 is annular with its center open.

The load on the closure section 4 is confined to the pressure exerted on the central portion by a suitable seal such as sealing ring 6 having on its upper surface an O-ring 7 sealing against the bottom surface 8 of the closure section 4 and having on its outer surface an O-ring 9 sealing against a counter bore 10 in the inner closure section 5. Radially inside the O-rings 7 and 9, the vessel pressure is effective to urge the ring 6 and closure section 4 outward. Radially outside the O-rings 7 and 9, the pressure is effectively atmospheric pressure. The total load upon the closure section 4 is, accordingly, proportional to the diameter $D_1^2$ or is equal to $K(D_1^2)$, where K is a constant for any operating pressure and $D_1$ is the diameter of O-ring 9.

A similar sealing ring 11 is arranged between the inner closure section 5 and the body section 1. The sealing ring 11 carries an O-ring 12 bearing on the bottom surface 13 of the section 5 and an O-ring 14 bearing on the bore of the body section 1. Radially inside the O-rings 12 and 14, the full pressure of the vessel is effective. Radially outside the O-rings 12 and 14, the pressure is effectively atmospheric pressure. The pressure acted upon the annular closure section 5 is effectively proportional to the difference in the squares of the diameters $D_2$ and $D_1$ or $K(D_2^2 - D_1^2)$ where K is a constant, $D_2$ is the diameter of O-ring 14 and $D_1$ is the diameter of O-ring 9. By this arrangement, the load applied to the closure sections 4 and 5 is divided so that neither section carries more than its share of the load. It is obvious that the closure could be divided into more than two sections, in which cases the outer section would be cylindrical and would correspond to the closure section 4 and the inner sections would be annular, corresponding to the closure section 5 but with different inside diameters so the effective load carrying area of each section would be equalized.

The advantage of the closure of FIG. 1 is brought out by comparison with a conventional closure, illustrated in FIG. 2 where a one piece cylindrical closuer 15 is screwed into the threaded outer end 16 of a pressure vessel. The stress distribution is illustrated in FIG. 3 where the threads illustrated at 17 in FIG. 3 correspond to the threads of the pressure vessels of FIGS. 1 and 2. In FIG. 2, the stress due to the pressure in the vessel rises to peak 20 in the first two or three threads 21. The stress then falls rapidly along curve 22 so that the threads 23 carry little or no load. Since the peak stress is the limiting factor, the FIG. 2 closure is not efficient. Furthermore, if there should be a failure, it will occur in the region of the threads 21 where the beginning of the failure will not be evident and once started, the failure will quickly proceed to rupture.

The stress distribution for the FIG. 1 closure is shown in FIG. 3 on the same scale to bring out the advantages. The threads engaged by the annular closure 5 are subjected to stress indicated by the curve at the left in FIG. 3. The threads 21a occupying the same position as the threads 21 in FIG. 2 are subjected to a quickly rising stress as indicated by curve 24, and the stress falls off to a minimum in the region of threads 24a as indicated by the curve 25. However, because the inner closure 5 is annular, only a fraction of the total pressure load is carried by the closure. This means that the peak 26 is much lower than the peak 20. Furthermore, since there are fewer threads between the region 21a and the region 24a, there is less drop off from the peak stress 26 and equalization of the stress on the threads.

The stress on the threads engaged by the closure 4 in FIG. 1 is highest on the threads in the region 21b, rising quickly to a peak 26b and the stress then drops off along curve 27 and becomes a minimum in the region of threads 23b which correspond to threads 23 in FIG. 2. The stress on the threads engaged by the closure section 4 is equalized by two factors, first, the total load applied to the closure 4 is only a fraction of the load and second, there are fewer threads between the regions 21b and 23b and, accordingly, less drop off in the thread loading.

From one aspect, the closure of FIG. 1 is graded so that the individual closure sections and each of the threads in engagement therewith come close to carrying a fair share of the load, thereby avoiding the peak stresses which could result in stress failure.

What is claimed as new is:

1. In a pressure vessel having a threaded end, a plurality of closure members screwed onto said threaded end, a series of annular seals between the closure members, each seal being subject internally to the internal vessel pressure and externally to outside pressure, said seals being arranged with the seal of smallest diameter engaging the outermost closure member and with the diameter of each seal increasing progressively to a maximum at the innermost closure member whereby the outermost closure member carries the load corresponding to the vessel pressure acting over the area of said smallest diameter and the inner closure members each carry the load corresponding to the vessel pressure acting over the area between adjacent seals of the series.

2. In a pressure vessel subject to internal vessel pressure and external vessel pressure, said vessel having a threaded end, a series of closure members successively screwed onto said threaded end and respectively spaced apart from each other so each stresses independently the threads onto which it is screwed, a series of annular seals between the closure members, each seal being subject internally to one of the vessel pressures and externally to the other of the vessel pressures, said seals being arranged with the seal of smallest diameter engaging the closure member at one end of the series of closure members and with the seals progressively increasing in diameter whereby each closure member carries a load corresponding to the difference between the vessel pressures acting on opposite sides of the closure member and each closure member is subject to a differential pressure load corresponding to a fraction of the cross sectional area of the vessel.

3. In a pressure vessel having a threaded end, a plurality of closure members screwed onto said threaded end and spaced apart from each other so each stresses independently the threads onto which it is screwed, a series of annular seals each subject internally to the internal vessel pressure and externally to the outside pressure, said seals being arraned with the seal of smallest diameter engaging the inner surface of the outermost closure member and with the diameter of each seal increasing progressively to a maximum at the innermost closure member and with each of the inner closure members arranged between adjacent seals of the series.

References Cited by the Examiner
UNITED STATES PATENTS
2,492,006  12/1949  Raybould _____ 220—46 X FOREIGN PATENTS
68,519  5/1893  Germany.

THERON E. CONDON, *Primary Examiner.*
GEORGE E. LOWRANCE, *Examiner.*